United States Patent [19]

Tate

[11] 3,924,685

[45] Dec. 9, 1975

[54] METHOD FOR OIL RECOVERY
[75] Inventor: Jack F. Tate, Houston, Tex.
[73] Assignee: Texaco Inc., New York, N.Y.
[22] Filed: Dec. 20, 1974
[21] Appl. No.: 534,982

[52] U.S. Cl. ............................. 166/308; 252/8.55 R
[51] Int. Cl.² ..................... E21B 43/25; E21B 43/26
[58] Field of Search........ 166/308, 271, 305 R, 307, 166/273–275, 254, 281–283; 252/8.55 D, 8.55 R, 8.55 C

[56] References Cited
UNITED STATES PATENTS

| | | | |
|---|---|---|---|
| 2,267,548 | 12/1941 | Berl ..................................... | 166/275 |
| 2,742,426 | 4/1956 | Brainerd, Jr. .................. | 252/8.55 R |
| 2,774,740 | 12/1956 | Magram ..................... | 252/8.55 R X |
| 3,724,544 | 4/1973 | Tate .................................... | 166/271 |
| 3,791,446 | 2/1974 | Tate .................................... | 166/307 |

OTHER PUBLICATIONS

McCutcheon, John W., "Surfactants Listed ...", Reprint from "Soap & Chemical Specialties," 1958, 475 Fifth Ave., N.Y., N.Y., pp. 11, 19, 30, 31, 40, 66.

Primary Examiner—Stephen J. Novosad
Attorney, Agent, or Firm—T. H. Whaley; C. G. Ries; James F. Young

[57] ABSTRACT

The production of hydrocarbons from a subterranean hydrocarbon-bearing formation is stimulated by injecting into the formation an aqueous solution of a compound hereinafter described. The elimination of plugging of capillary openings within the formation and mineral scale deposition on production equipment due to post-precipitation of dissolved salts subsequent to treatment by means of said compound results in a substantial improvement in hydrocarbon recovery.

13 Claims, No Drawings

METHOD FOR OIL RECOVERY

FIELD OF THE INVENTION

This invention relates to a method for stimulating the production of fluids from earthen formations. More particularly, this invention relates to a method in which the productivity of a hydrocarbon-bearing formation is improved upon treatment of the formation with an aqueous solution of a compound later described, said compound effecting the elimination of plugging of capillary openings due to post-precipitation of sparingly soluble salts, effecting elimination of mineral scale on production equipment such as pumps, tubing, etc., caused by such precipitation, and effecting enhanced oil recovery by reduction of retentive forces of capillarity.

DESCRIPTION OF THE PRIOR ART

The technique of increasing the deliverability of a subterranean hydrocarbon-bearing formation by injection of water and thereby stimulating the production of fluids therefrom has long been practiced in the art. The technique is applicable in both limestone and sandstone. In the usual treatment procedure, the aqueous medium is introduced into the well and under sufficient pressure is forced into the adjacent subterranean formation where it dissolves formation components, particularly the carbonates such as calcium carbonate and magnesium carbonate.

During the stimulation process passageways for fluid flow are created or existing passageways therein are enlarged thus stimulating the production of oil, water, brines and various gases. If desired, the stimulation may be carried out at an injection pressure sufficiently great to create fractures in the strata or formation which has the desired advantage of opening up passageways into the formation along which the aqueous medium can travel to more remote areas from the well bore.

There are, however, troublesome complications attending the use of this process. After stimulation is completed, the well is put back on production. The sparingly soluble carbonates, dissolved at the higher reservoir temperatures, may re-precipitate as temperature and hence solubility decrease. Such precipitation, when it occurs within the capillaries of a tight formation or on the tubing or annulus as a mineral scale, can severely lessen production rate by plugging such capillaries or well equipment. In actual practice, the short-lived effectiveness of some stimulations is attributed to salt re-deposition.

In addition, with the exception of increasing the drainage area, and therefore the average permeability by matrix dissolution or hydraulic fracturing, little benefit is obtained. The complete immiscibility of the oil in the water and the retentive forces of capillarity which maintain the oil in the matrix severely limit the production of incremental oil by mere injection of water alone.

It is therefore, the principal object of the present invention to overcome the defects of the prior art in treating fluid-bearing formations such as hydrocarbon-bearing formations, etc., by providing a method of and composition for stimulation employing the novel composition of this invention.

SUMMARY OF THE INVENTION

This invention encompasses and includes a method for increasing the production of fluids from a subterranean fluid-bearing formation comprising injecting down the well bore to said formation and therefrom into said formation under a pressure greater than the formation pressure an aqueous solution of a compound hereinafter more fully described, optionally containing a propping agent therewith, maintaining said aqueous admixture in contact with the formation strata for a time sufficient for the surfactant admixture to chemically react with the components of the formation.

The novel method of this invention uses an aqueous solution having dissolved therein a compound hereinafter described. The concentration of the compound present in the aqueous solution is such that it is capable of reacting with the soluble components of the fluid-bearing strata so as to prevent reprecipitation of sparingly soluble salts and enhance oil production by reducing retentive forces of capillarity.

DETAILED DESCRIPTION OF THE INVENTION

In its broadest embodiment the method for the present invention comprises introducing into a subsurface formation an aqueous solution of a compound hereinafter described wherein the said solution is maintained in contact with the formation for a time sufficient to chemically react with the formation so as to increase substantially the flow capabilities of the formation by reducing interfacial tension and hence retentive forces of capillarity.

An advantage resulting from the employment of the method of this invention in stimulating fluid-bearing formations is that the post-precipitation of dissolved carbonates is prevented or materially decreased. Such post-precipitation occurs because the salts become less soluble as temperatures decrease. Such a decrease occurs as the fluids near the production equipment. Such post-precipitation occurring within the formation matrix near the bore hole can decrease permeability by plugging the formation capillaries, particularly those near the well bore, and result in a lower production rate. Furthermore, such post-precipitaton can occur in the tubing or annulus of the well itself and manifest itself as mineral scale, reducing their diameter(s) and resulting in a lower production rate.

The compound used in preparing the aqueous solution of the present invention is a water-soluble substituted taurine having the following general formula:

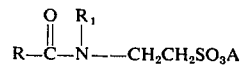

wherein R and $R_1$ are aliphatic hydrocarbon groups, both either saturated or unsaturated (except for the methyl group), each of said groups R and $R_1$ containing from 1 to 20 carbon atoms therein, the sum total of the carbon atoms in both R and $R_1$ being between 9 and 30, and A is an alkali metal or ammonium ion.

Representative substituted taurines include those wherein either the R group or the $R_1$ group is methyl, ethyl, propyl, butyl, pentyl, hexyl, heptyl, octyl, nonyl, decyl, undecyl, tridecyl, tetradecyl, pentadecyl, hexadecyl, heptadecyl, octadecyl, nonadecyl, and eicosyl, including the branched chain and unsaturated variants thereof, such as oleyl. It is to be understood that mixtures of these above named R and $R_1$ groups can be used, such as those obtained from coconut, tall oil, tallow and palm oils.

The preferred class of substituted taurines are those wherein the $R_1$ substituent is a relatively low molecular weight aliphatic hydrocarbon group such as methyl, ethyl, propyl, isopropyl, butyl or isobutyl and the other substituent R, is a saturated or unsaturated including branched chain, aliphatic hydrocarbon containing between 8 and 20 carbon atoms, including more specifically such hydrocarbons derived from the coconut, palm and tall oil acids etc., high in oleyl groups.

The concentration of the compound in the aqueous solution can vary from about 0.005 to about 2 percent by weight, preferably from about 0.05 to about 1 percent by weight.

In carrying out the method of this invention, an aqueous solution is prepared by mixing the compound with water at the desired concentration. The thus-prepared aqueous solution is forced, usually via a suitable pumping system, down the well bore and into contact with the production equipment and formation to be treated. As those skilled in the art will readily understand, the pressure employed is determined by the nature of the formation, viscosity of the fluid, and other operating variables. The stimulation method of this invention may be carried out at a pressure sufficient merely to penetrate the formation or it may be of sufficient magnitude to overcome the weight of the overburden and create fractures in the formation. Propping agents, to prop open the fractures as created, for example 20 to 60 mesh sand, in accordance with known fracturing procedures, may be employed in admixture with the aqueous surfactant admixture. The solution is best kept in contact with the formation and production equipment until the compound can adsorb upon the formation matrix and reduce the interfacial tension. After this, the treating solution is reversed out of the well, i.e., it is allowed to flow back out or to be pumped out of the formation.

In the method of this invention, the compound in the aqueous solution provides means whereby calcium ions having tendencies to precipitate as $caCO_3$ or $CaSO_4$ from a super-saturated solution of $CaCO_3$, $Ca(HCO_3)_2$ or $CaSO_4$ that is produced by the reaction of aqueous system with the formation, does not precipitate from the spent treating solution. This binding up of the aforementioned calcium ions from weakly ionizable compounds permits the formed calcium-compound complex to remain dissolved in the treating solution and pass through the formation pores and production equipment.

Further, the compound of the invention provides means whereby the nucleation and growth of the solid itself is thwarted, so that solid calcium carbonate does not precipitate from the spent treating solution.

Further, the compound of the invention provides means whereby continuous protection against postprecipitation of $CaCO_3$, or $CaSO_4$ is obtained for a considerable period of time subsequent to treatment due to continuous slow desorption of the component from the formation surfaces. In contrast, use of surfactants having merely dispersant and suspending properties and not possessing the capability of molecularly binding up these produced calcium ions or thwarting the nucleation and growth of the solid $CaCO_3$ will permit deposition of calcium carbonate or calcium sulfate to occur from such treating solution with the likelihood of plugging the formation passageways and production equipment during subsequent recovery of desirable formation hydrocarbons therethrough. Finally, the compound of the invention reduces the retentive forces of capillarity within the formation providing enhanced oil recovery over treatment with water alone.

Following is a description by way of example of the method of the invention.

EXAMPLE I

A producing well in the Lincoln Southeast Field is treated in the following manner.

A treating mixture is prepared by mixing 10,000 gallons of source pond water containing about 400 ppm chloride and 122 ppm calcium with 100 gallons of the compound Sodium N,N-methyloleoyltaurate. Fifteen thousand pounds of frac sand is added to the aqueous surfactant admixture. The treating mixture is introduced into the formation at a rate of about 7 BPM at 3,000 psig. The shut-in tubing pressure is 2,500 psig which bled down to zero in a short time. The well is shut in for 13 hours and then returned to production. Estimated production rate increase is from 50 BOPD to 300 BOPD.

EXAMPLES II-III

The procedure of Example I is repeated using

EXAMPLE II—Sodium N,N-methylpalmitoyltaurate.
EXAMPLE III—Sodium N,N-methyl tall oil acid taurate.

The compositions of the present invention are especially effective in the presence of high calcium ion concentrations about 0.5 percent by weight or more, and particularly and somewhat uniquely in applications where high aqueous solution temperatures are encountered such as above 100°C. The compositions of the present invention are temperature stable and effective as scale inhibitors at temperatures up to about 150°C. e.g. 100°–150°C.

The composition of Example I above can be prepared in the following manner:

The sodium salt of taurine, $NH_2CH_2CH_2SO_3Na$, is reacted with methyl amine to prepare the intermediate sodium N-methyltaurate. This intermediate is reacted with the acid chloride of oleic acid to complete the preparation of sodium N,N-methyloleoylaurate. The conditions under which this known reaction is conducted is well known in the art, including obvious variations thereof.

Obviously, other modifications and variations of the invention as hereinbefore set forth may be made without departing from the spirit and scope thereof and therefore only such limitations should be imposed as are indicated in the appended claims.

I claim:

1. Method of increasing and sustaining the production of fluids from a subterranean fluid-bearing formation comprising injecting down the well bore penetrating said formation and injecting therefrom into said formation under a pressure greater than the formation pressure, an aqueous solution containing a water-soluble substituted taurine having the following general formula:

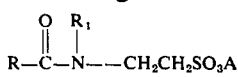

wherein R and R₁ are aliphatic hydrocarbon groups, including the corresponding unsaturated aliphatic hydrocarbons, mixtures and isomers, each group containing from 1 to 20 carbon atoms therein, the sum total of the carbon atoms in R and R₁ being between 9 and 30, and A is an alkali metal or ammonium ion.

2. Method as claimed in claim 1, wherein said compound is present in said aqueous solution in an amount of from about 0.05 to about 1 percent by weight.

3. Method as claimed in claim 1, wherein the R₁ substituent of said substituted taurine is a low molecular weight aliphatic hydrocarbon group containing from one to four carbon atoms therein.

4. Mehtod as claimed in claim 1, wherein the R substituent of said substituted taruine is at least one member selected from the group consisting of saturated aliphatic hydrocarbons, unsaturated aliphatic hydrocarbons, branched chain isomers and mixtures of said hydrocarbons.

5. Method as claimed in claim 1, wherein said substituted taurine is the sodium salt of N,N-methyloleoyltaurate.

6. Method as claimed in claim 1, wherein said substituted taurine is the sodium salt of N,N-methylpalmitoyltaurate.

7. Method as claimed in claim 1, wherein said substituted taurine is the sodium salt of N,N-methylacyltaurate said acyl substituent being obtained from tall oil acids.

8. Method as claimed in claim 1, wherein in said substituted taurine, R is a mixture of aliphatic hydrocarbon groups obtained from coconut oil acids.

9. Method as claimed in claim 1, wherein in said substituted taurine, R is a mixture of aliphatic hydrocarbon groups obtained from tallow oil acids.

10. Method as claimed in claim 1, wherein in said substituted taurine, R is a mixture of aliphatic hydrocarbon groups obtained from tall oil acids.

11. Method as claimed in claim 1, wherein a frac sand is also present in said solution.

12. Method as claimed in claim 1, wherein the said aqueous solution is injected down the well bore penetrating said formation under a pressure greater than the formation pressure and sufficient to create fractures in the formation.

13. Method as claimed in claim 1, wherein the said aqueous solution is injected down the well bore penetrating said formation under a pressure greater than the formation pressusre but less than the pressure required to create fractures in the formation.

* * * * *